US009995935B2

(12) United States Patent
Dobschal et al.

(10) Patent No.: US 9,995,935 B2
(45) Date of Patent: Jun. 12, 2018

(54) SPECTACLE LENS FOR A DISPLAY DEVICE THAT CAN BE FITTED ON THE HEAD OF A USER AND GENERATES AN IMAGE, AND DISPLAY DEVICE WITH SUCH A SPECTACLE LENS

(71) Applicant: Carl Zeiss Smart Optics GmbH, Aalen (DE)

(72) Inventors: Hans-Juergen Dobschal, Kleinromstedt (DE); Karsten Lindig, Erfurt (DE)

(73) Assignee: tooz technologies GmbH, Aalen (DE)

( * ) Notice: Subject to any disclaimer, the term of this patent is extended or adjusted under 35 U.S.C. 154(b) by 133 days.

(21) Appl. No.: 15/025,190

(22) PCT Filed: Sep. 25, 2014

(86) PCT No.: PCT/EP2014/070556
§ 371 (c)(1),
(2) Date: Mar. 25, 2016

(87) PCT Pub. No.: WO2015/044301
PCT Pub. Date: Apr. 2, 2015

(65) Prior Publication Data
US 2016/0238843 A1 Aug. 18, 2016

(30) Foreign Application Priority Data
Sep. 27, 2013 (DE) .......................... 10 2013 219 624

(51) Int. Cl.
G02B 27/10 (2006.01)
G02B 27/01 (2006.01)
(Continued)

(52) U.S. Cl.
CPC ..... *G02B 27/0172* (2013.01); *G02B 27/0081* (2013.01); *G02B 27/30* (2013.01);
(Continued)

(58) Field of Classification Search
CPC ................ G02B 27/0172; G02B 27/30; G02B 27/0081; G02B 2027/013;
(Continued)

(56) References Cited

U.S. PATENT DOCUMENTS

| 5,348,477 A | 9/1994 | Welch et al. |
| 5,803,673 A | 9/1998 | Reinsch et al. |

(Continued)

FOREIGN PATENT DOCUMENTS

| DE | 102011007811 A1 | 10/2012 | |
| EP | 1 385 023 A1 * | 1/2004 | ............... G02B 5/18 |
| WO | 2006025317 A1 | 3/2006 | |

OTHER PUBLICATIONS

International Preliminary Report on Patentability rendered by the International Bureau of WIPO for PCT/EP2014/070556, dated Mar. 29, 2016, 13 pages.

*Primary Examiner* — Joseph P Martinez
(74) *Attorney, Agent, or Firm* — Skaar Ulbrich Macari, P.A.

(57) ABSTRACT

A spectacle lens for a display device can be fitted on the head of a user and generate an image. The spectacle lens body can include a front side, a rear side, a coupling-in section in an edge area of the spectacle lens and a coupling-out section in a central area of the spectacle lens, two opposing reflecting surfaces in the area of the coupling-in section, and facets embedded in the area of the coupling-in section in the spectacle lens body between the two reflecting surfaces and arranged next to each other in the direction from the coupling-in to the coupling-out section in a first and an adjoining second area. The facets in the first area can be partially reflective or reflective. The facets in the second area can be partially reflective. Directly neighboring facets in the second area can be connected by a partially transparent or wholly transparent face.

11 Claims, 4 Drawing Sheets

(51) Int. Cl.
  *G02B 27/00* (2006.01)
  *G02B 27/30* (2006.01)
(52) U.S. Cl.
  CPC .. *G02B 2027/012* (2013.01); *G02B 2027/013* (2013.01); *G02B 2027/0123* (2013.01); *G02B 2027/0178* (2013.01)
(58) Field of Classification Search
  CPC ...... G02B 2027/0123; G02B 2027/012; G02B 2027/0178
  See application file for complete search history.

(56) References Cited

U.S. PATENT DOCUMENTS

| | | | |
|---|---|---|---|
| 6,091,546 | A | 7/2000 | Spitzer |
| 6,157,353 | A | 12/2000 | Song et al. |
| 6,825,987 | B2 | 11/2004 | Repetto et al. |
| 7,719,769 | B2 | 5/2010 | Sugihara et al. |
| 8,189,263 | B1 | 5/2012 | Wang et al. |
| 8,456,744 | B2 | 6/2013 | Dobschal et al. |
| 8,970,961 | B2 | 3/2015 | Dobschal et al. |
| 2006/0126181 | A1 | 6/2006 | Levola |
| 2009/0190222 | A1 | 7/2009 | Simmonds et al. |
| 2010/0220295 | A1 | 9/2010 | Mukawa et al. |
| 2012/0098734 | A1 | 4/2012 | Totani et al. |
| 2013/0250429 | A1* | 9/2013 | Dobschal ............... G02B 3/08 359/631 |

\* cited by examiner

Fig. 5

SPECTACLE LENS FOR A DISPLAY DEVICE THAT CAN BE FITTED ON THE HEAD OF A USER AND GENERATES AN IMAGE, AND DISPLAY DEVICE WITH SUCH A SPECTACLE LENS

PRIORITY

This application claims the benefit of German Patent Application No. 02013219624.5 filed on Sep. 27, 2013, which is hereby incorporated herein by reference in its entirety.

FIELD

The present invention relates to a spectacle lens for a display device that can be fitted on the head of a user and generates an image, and a display device with such a spectacle lens.

BACKGROUND

Spectacle lenses are often formed such that light bundles of pixels of the generated image are coupled into the spectacle lens via a coupling-in section, guided in the spectacle lens by total internal reflection on the front and the rear side to a coupling-out section and deflected there such that a coupling-out takes place via the rear side of the spectacle lens.

In the case of the coupling-in section the difficulty can arise that after total internal reflection on the rear side an already coupled-in or deflected bundle of beams strikes the coupling-in section again and is there deflected in an undesired manner such that it is converted into stray light. In order to prevent this, the thickness of the spectacle lens would have to be increased (for example to within the range from 10 to 20 mm), which is, however, undesired. Alternatively, the field of view and/or the size of the exit pupil or eyebox could be reduced, which is also undesired, however.

SUMMARY

An object of the invention is to provide a spectacle lens for a display device that can be fitted on the head of a user and generates an image, with which the difficulties named above can be overcome almost completely.

The disclosure includes a spectacle lens for a display device that can be fitted on the head of a user and generates an image, wherein the spectacle lens comprises a spectacle lens body comprising a front side and a rear side, as well as, seen in top view onto the spectacle lens, a coupling-in section in an edge area of the spectacle lens and a coupling-out section in a central area of the spectacle lens, two opposing reflecting surfaces in the area of the coupling-in section and facets which are embedded in the area of the coupling-in section in the spectacle lens body between the two reflecting surfaces and arranged next to each other in the direction from the coupling-in to the coupling-out section in a first and an adjoining second area, wherein the facets in the first area are partially reflective or reflective, the facets in the second area are partially reflective and directly neighboring facets in the second area are connected by a face which is partially transparent or transparent, wherein the spectacle lens is suitable for guiding light bundles of pixels of the generated image, which are coupled into the spectacle lens via the coupling-in section of the spectacle lens, in the spectacle lens by reflections to the coupling-out section and coupling them out of the spectacle lens via the coupling-out section, and wherein the facets in the first area reflect the light bundles striking it for the coupling-in at least partially to the second reflecting surface, at which a reflection in the direction to the first reflecting surface takes place for the guiding of the light bundles, wherein light bundles striking the faces in the second area thereby run through the faces to the first reflecting surface and are reflected on the first reflecting surface for the guiding of the light bundles and, after the reflection, transmitted through the partially reflective facets in the second area.

Through this formation of the facets in the two areas, two optical functions are advantageously provided in the second area. On the one hand the light bundles which have already been coupled into the spectacle lens by reflection on facets of the first area for the guiding are reflected on the first reflecting surface such that after passing through the facets of the second area (the facets are passed through virtually from behind) they are guided in the desired manner. On the other hand the light bundles which have yet to be coupled in and strike facets for the first time (in this case facets of the second area) are deflected in the desired manner such that they are likewise guided to the coupling-out section.

Through this procedure, already coupled-in light bundles can thus strike the second area with facets problem-free for the coupling-in of further light bundles, with the result that the extent of the coupling-in section in the direction of the coupling-out section is not limited by the fact that already coupled-in light bundles must not strike the coupling-in section again. The entirety of all the light bundles to be coupled in can thus have the desired large extent in the direction from the coupling-in to the coupling-out section, in order to provide a large field of view and/or a large extent of the exit pupil in this direction. Naturally, the coupling-in section can also comprise a third and further areas, which adjoin the second area and further guide the already coupled-in light bundles, in the same way as in the second area, in the desired manner and deflect light bundles entering for the first time such that the desired guiding to the coupling-out section is possible. The front side and/or rear side of the spectacle lens body can be formed curved.

By a facet is meant, in particular, a piece of surface, a surface element or a surface. The piece of surface, the surface element or the surface can provide the described optical effect of the facet.

In particular, the first reflecting surface can be formed by the front side. Furthermore, the second reflecting surface can be formed by the rear side.

Alternatively, it is possible for the first and/or the second reflecting surface to be formed between the front and the rear side. In this case, the first and/or the second reflecting surface can also be formed flat.

The reflectivity of the first reflecting surface can increase in the direction from the coupling-in to the coupling-out section. The reflectivity of the facets can also increase in this direction.

The coupling-in section and/or the coupling-out section can have an imaging effect. Furthermore, the coupling-in section can have a collimation effect.

The disclosure also includes a spectacle lens for a display device that can be fitted on the head of a user and generates an image, wherein the spectacle lens comprises a spectacle lens body comprising a curved front side and a rear side, as well as, seen in top view onto the spectacle lens, a coupling-in section in an edge area of the spectacle lens and a coupling-out section in a central area of the spectacle lens, two opposing reflecting surfaces in the area of the coupling-out section and facets which are embedded in the area of the coupling-out section in the spectacle lens body between the two reflecting surfaces and arranged next to each other in the direction from the coupling-in to the coupling-out section in a first and an adjoining second area, wherein the facets in the first area are partially reflective, the facets in the second area are partially reflective or reflective and directly neighboring facets in the first area are connected by a face which is partially transparent or transparent, wherein the spectacle lens is suitable for guiding light bundles of pixels of the generated image, which are coupled into the spectacle lens via the coupling-in section of the spectacle lens, in the spectacle lens by reflection to the coupling-out section and coupling them out of the spectacle lens via the coupling-out section, and wherein, for the coupling-out, the facets in the first area partially reflect the light bundles striking it for the coupling-out towards the second reflecting surface and partially transmit them to the first reflecting surface, at which a reflection in the direction to the second reflecting surface takes place, wherein light bundles striking the faces in the first area thereby run through the faces to the second reflecting surface and are reflected on the second reflecting surface to facets in the second area and reflected by the latter towards the second reflecting surface for the coupling-out.

Through this formation of the coupling-out section, an effective pupil expander is provided.

The spectacle lens with this coupling-out section formed as a pupil expander can be developed in the same way as the already described spectacle lens according to the invention. In particular, the two spectacle lenses can also be combined in such a way that the described facet structure of the coupling-in section is combined with the described facet structure of the coupling-out section.

The disclosure further includes an optical element for guiding light bundles, which comprises a transparent body for the light bundles with a front side and a rear side, a coupling-in section and, spaced apart from this, a coupling-out section, two opposing reflecting surfaces in the area of the coupling-in section and facets which are embedded in the area of the coupling-in section between the two reflecting surfaces and arranged next to each other in the direction from the coupling-in to the coupling-out section in a first and an adjoining second area, wherein the facets in the first area are partially reflective or reflective, the facets in the second area are partially reflective and directly neighboring facets in the second area are connected by a face which is partially transparent or transparent, wherein the optical element is suitable for guiding the light bundles which are coupled into the optical element via the coupling-in section in the optical element by reflection to the coupling-out section and coupling them out of the optical element via the coupling-out section, and wherein the facets in the first area reflect the light bundles striking it for the coupling-in at least partially to the second reflecting surface, at which a reflection in the direction to the first reflecting surface takes place for the guiding of the light bundles, wherein light bundles striking the faces in the second area thereby run through the faces to the first reflecting surface and are reflected on the first reflecting surface for the guiding of the light bundles and, after the reflection, transmitted through the partially reflective facets in the second area.

Such an optical element can be developed in the same way as the already described spectacle lenses.

In particular, the two reflecting surfaces can be formed on the front side and the rear side. Furthermore, the reflecting surfaces can bring about the reflection by total internal reflection on the front and the rear side.

The facets are in particular formed such that they do not bring about a desired diffractive effect.

The first and the second area of the coupling-in and/or the coupling-out section preferably comprise in each case at least one, two or more facets.

The disclosure also includes a display device, with a holder that can be fitted on the head of a user, an image-generating module secured to the holder, which generates an image, and an imaging optical system secured to the holder, which comprises a spectacle lens according to the invention and which, when the holder is fitted on the head, images the generated image such that the user can perceive it as a virtual image.

The imaging optical system can comprise the spectacle lens as the only optical element. However, it is also possible for the imaging optical system to comprise, in addition to the spectacle lens, also at least one further optical element.

Thus, the further optical element can be e.g. a collimation optical system which is arranged between the spectacle lens and the image-generating module, with the result that the light bundles from the image-generating module are coupled into the spectacle lens as collimated bundles.

The image-generating module can in particular comprise a two-dimensional imaging system, such as e.g. an LCD module, an LCoS module, an OLED module or a tilting mirror matrix. The imaging system can be self-luminous or not self-luminous.

The image-generating module can in particular be formed such that it generates a monochromatic or a multi-colored image.

The spectacle lens according to the invention can be produced from glass and/or plastic.

The display device according to the invention can comprise further elements known to a person skilled in the art which are necessary for its operation.

It is understood that the features mentioned above and those yet to be explained below can be used not only in the stated combinations but also in other combinations or alone, without departing from the scope of the present invention.

While the invention is amenable to various modifications and alternative forms, specifics thereof have been shown by way of example in the drawings and will be described in detail. It should be understood, however, that the intention is not to limit the invention to the particular example embodiments described. On the contrary, the invention is to cover all modifications, equivalents, and alternatives falling within the scope of the invention as defined by the appended claims.

DETAILED DESCRIPTION

In the following descriptions, the present invention will be explained with reference to various exemplary embodiments. Nevertheless, these embodiments are not intended to limit the present invention to any specific example, environment, application, or particular implementation described herein. Therefore, descriptions of these example embodiments are only provided for purpose of illustration rather than to limit the present invention.

Figure 1:
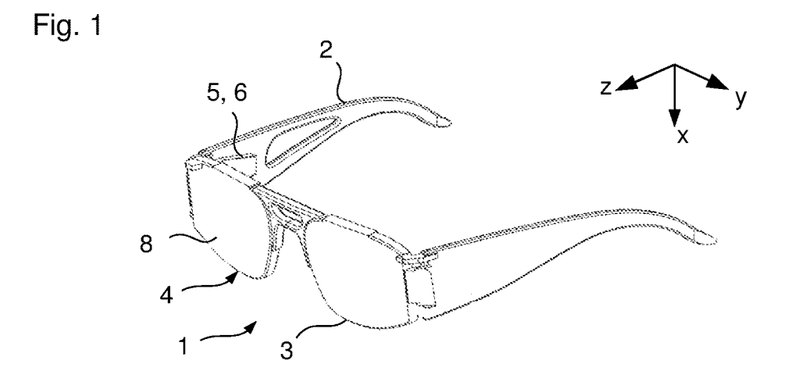
FIG. 1 is a schematic perspective representation of an embodiment of the display device according to the invention.

In the embodiment shown in FIG. 1 the display device 1 according to the invention comprises a holder 2 that can be fitted on the head of the user and can be formed e.g. in the manner of a conventional spectacles frame, as well as a first and a second spectacle lens 3, 4, which are secured to the holder 2. The holder 2 with the spectacle lenses 3 and 4 can be formed e.g. as sports glasses, sunglasses and/or glasses for correcting defective vision, wherein a virtual image can be reflected into the user's field of view via the first spectacle lens 3, as described below.

The spectacle lenses 3, 4, and in particular the left-hand spectacle lens 3, are only described together with the display device 1 according to the invention by way of example. The spectacle lenses 3, 4, or at least the left-hand spectacle lens 3, are in each case formed separately as a spectacle lens 3, 4 according to the invention. The left-hand spectacle lens 3 according to the invention can, naturally, also be formed as the right-hand spectacle lens.

Figure 2:
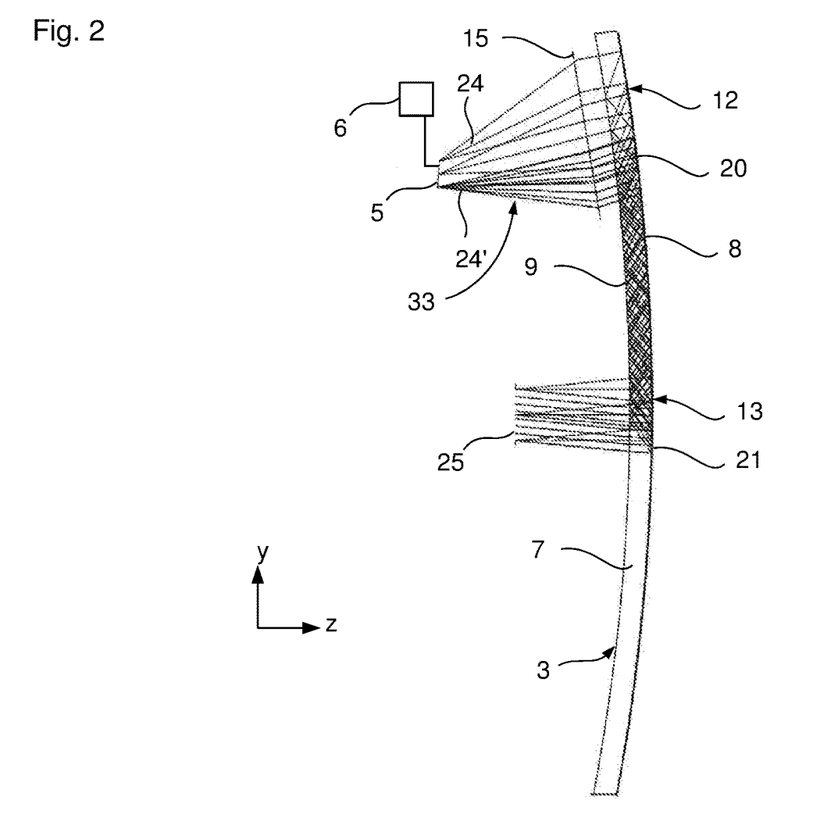
FIG. 2 is a magnified sectional view of the first spectacle lens.

As can best be seen from the detailed sectional view of the first spectacle lens 3 in FIG. 2 (the holder 2 is not represented), the display device 1 comprises an image-generating module 5, a control unit 6 and a coupling-in optical system 15. The image-generating module 5, the control unit 6 and the coupling-in optical system 15 are represented purely schematically and are preferably secured to the holder 2. The image-generating module 5 can comprise e.g. a two-dimensional light modulator, such as e.g. an OLED, CMOS or LCoS chip or a tilting mirror matrix with a plurality of pixels e.g. arranged in rows and columns. A light bundle 24 can emerge from each pixel.

The left-hand spectacle lens 3 comprises a spectacle lens body 7 with a curved front side 8 and a curved rear side 9, wherein a coupling-in section 20 is formed on the front side 8 in an edge area 12 of the first spectacle lens 3 and a coupling-out section 21 is formed in a central area 13 on the front side 8 of the first spectacle lens 3.

As shown in the schematic representation from FIG. 2, the light bundles 24, 24' coming from the image-generating module 5 (which form a total bundle of beams 33) are collimated by means of the coupling-in optical system 15, enter the first spectacle lens 3 via the rear side 9 and there strike the coupling-in section 20, which is formed reflective in such a way that it brings about a deflection of the light bundles 24 such that they are then guided in the spectacle lens 3 by total internal reflection on the rear and the front side 9, 8 to the coupling-out section 21. The coupling-out section 21 is formed reflective and deflects the light bundles 24, 24' in the direction of the rear side 9 such that they are coupled out of the spectacle lens 3 via the rear side 9 and run up to an exit pupil 25. When the holder is fitted on, the user can position his eye in the area of the exit pupil 25 and thus perceive the virtual image.

Figure 3:
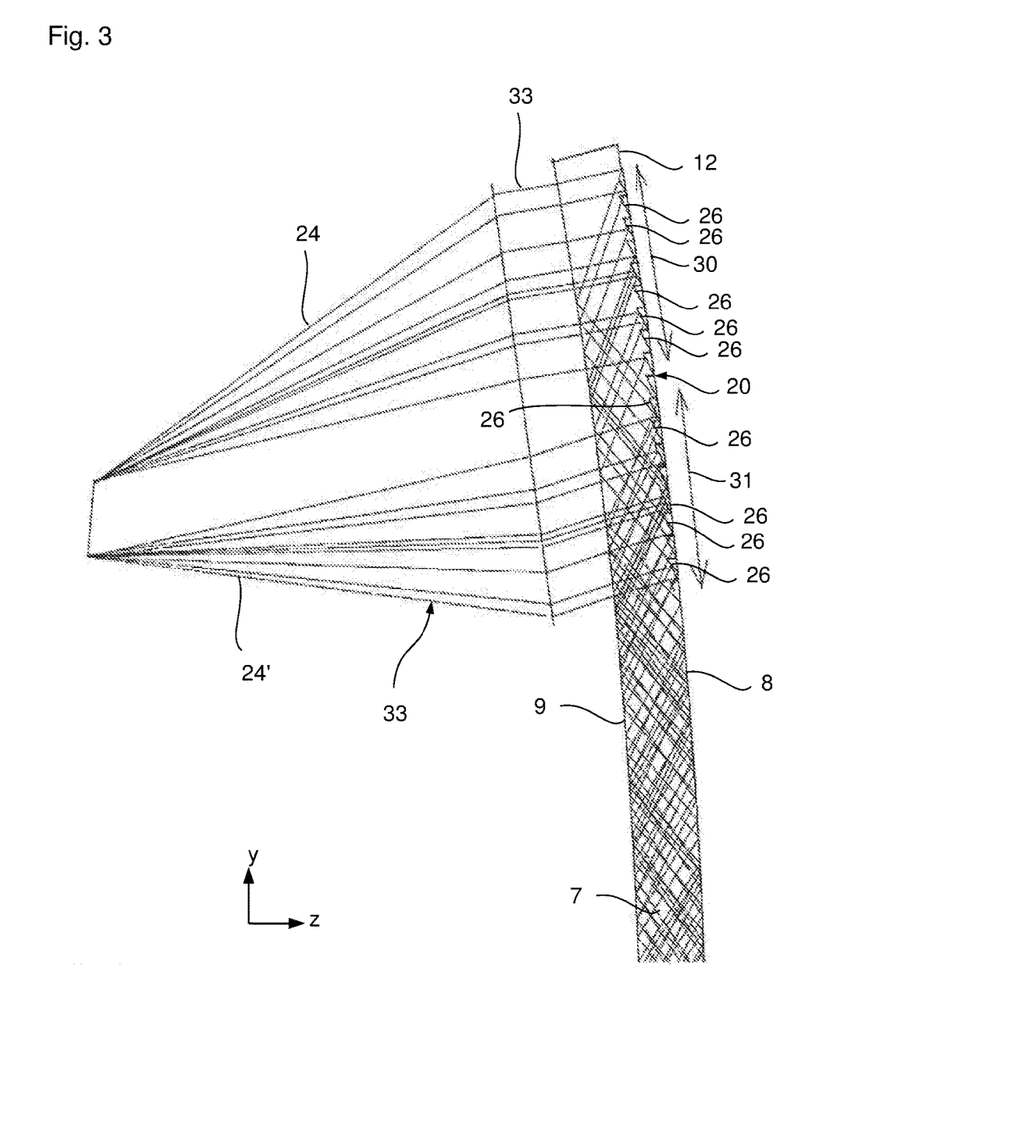
FIG. 3 is a magnified sectional view of the spectacle lens to describe the coupling-in section.

As can be seen in the magnified representation of the coupling-in section 20 in FIG. 3, the coupling-in section 20 comprises a plurality of partially reflective facets 26 arranged next to each other, which serve to deflect the light bundles 24, 24', wherein the facets 26 are buried in the spectacle lens body 7 and arranged next to each other in the direction from the coupling-in to the coupling-out section 20, 21 in a first area 30 and an adjoining second area 31. The extent of the two areas 30, 31 in the y-direction is chosen such that it corresponds to the extent of the collimated total bundle of beams 33 striking them. Because of this extent, the bundles of beams 24 deflected by the facets 26 of the first area 30, after total internal reflection on the rear side 9, for the guiding of the bundles of beams to the coupling-out section, strike the second area 31, in which the facets 26 are arranged for the deflection of the light bundles 24'. Thus, in the second area 31, there is a superimposition of light bundles 24 already guided by total internal reflection and bundles of beams 24' yet to be coupled in or deflected such that they can also be guided by total internal reflection.

Figure 4:
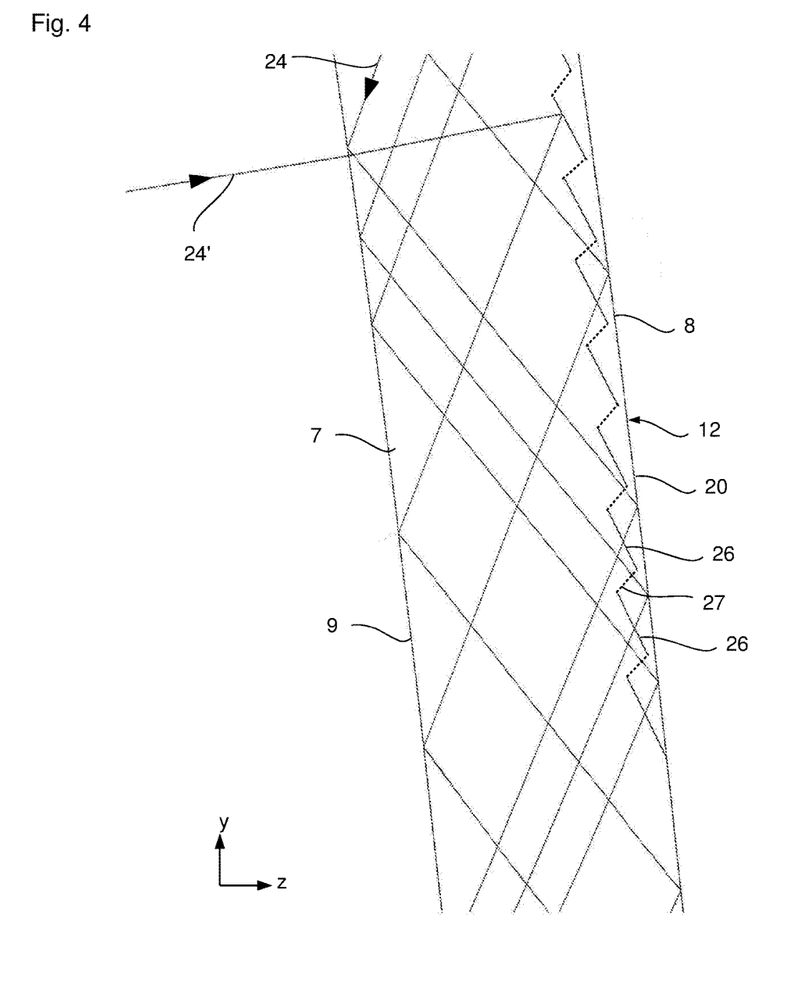
FIG. 4 is a representation, magnified again, of the coupling-in section from FIG. 3.

In order to be able to satisfy both of these optical requirements, the buried facets 26 in the second area 31 are connected in each case by transparent or at least partially transparent faces 27, which are represented as dashed lines in the magnified sectional representation of the second area in FIG. 4.

After total internal reflection on the rear side 9, the light bundles 24 which are deflected in the first area 30 of the coupling-in section 20 strike the second area 31 of the coupling-in section 20. Because of the described transparent or partially transparent formation of the faces 27, the light bundles 24 run through the faces 27 and are totally reflected on the front side 8 for the guiding, run through the partially reflective facets 26 in the second area 31 from behind and strike the rear side 9 again, with the result that the light bundles 24 are guided in the intended way to the coupling-out section 21 by further total reflections on the rear and the front side 9, 8. The light bundles 24' of the collimated total bundle of beams 33, which strike the facets 26 (here in the second area 31) for the first time for the coupling-in, are at least partially reflected back to the rear side 9 such that they are then guided to the coupling-out section by total internal reflection on the rear side 9 and the front side 10. The second area thus implements both optical requirements (guiding of the already coupled-in light bundles 24 and coupling-in of the further light bundles 24'). If the faces 27, as has been usual until now, were formed as reflective faces, this would result in undesired stray light. According to the invention, the extent of the coupling-in section 20 in the direction of the guiding of the light bundles 24 in the spectacle lens 3 is thus no longer limited by the fact that an already deflected light bundle 24 must not strike the coupling-in section 20 again. Thus, even in the case of a thin spectacle lens 3 and a large image or image field (size of the image generated by means of the image-generating module 5), a large eyebox or a large exit pupil 25 can be realized.

The front side 8 thus forms a first reflecting surface in the coupling-in section 20 and the rear side 9 thus forms a second reflecting surface in the coupling-in section 20, wherein the buried facets 26 are arranged between the two reflecting surfaces. If the faces 27 in the second area 31 are transparent, as a rule they are no longer visible. The representation of the faces 27 in FIG. 3 and in FIG. 4 only serves to better understand the invention. In the first area 30 the faces 27 connecting the facets 26 can be transparent, partially transparent or reflective. Furthermore, the facets 26 in the first area can be partially reflective or reflective.

To produce the coupling-in section 20, only the depressions for the facets 26 have to be formed on the front side 8. The facets 26 are then to be provided with the corresponding partially mirroring layer, wherein, however, the faces 27 are not coated. The facets 26 are then filled in up to the original radius of the front side 8, with the result that the front side 8 is also used for the light guiding by means of total internal reflection in the described manner in the area of the coupling-in section 20.

Figure 5:
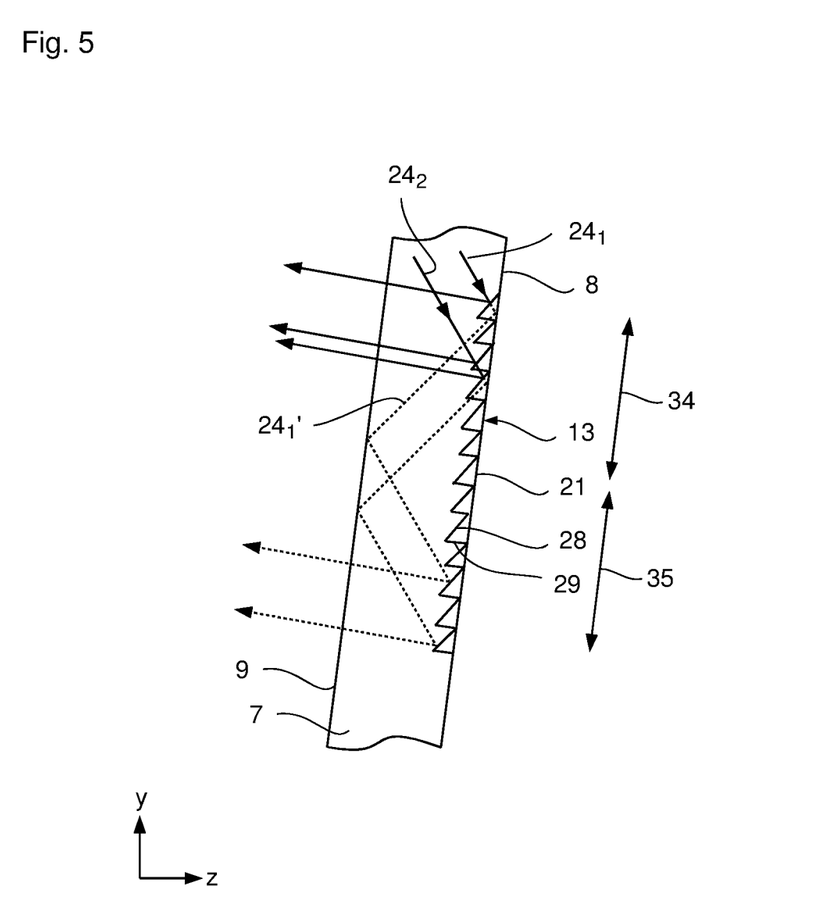
FIG. 5 is a magnified sectional representation of the coupling-out section.

As can be seen in the magnified representation in FIG. 5, the coupling-out section 21 can comprise several partially reflective facets 28 arranged next to each other, which are connected by partially reflective faces 29 or transparent faces 29. This results in the advantage that a light bundle $24_1$ which strikes a facet 28 in a first area 34 of the coupling-out section 21 is partially deflected towards the exit pupil 25 and partially $24_1'$ (represented as a dashed line) transmitted. The transmitted portion $24_1'$ is totally reflected on the front side 8, runs through the face 29 in the first area 34 of the coupling-out section 21 and, after total reflection on the rear side 9 again, strikes a further partially reflective facet 28 (in a second area 35 of the coupling-out section 21), at which another deflection in the direction of the exit pupil 25 takes place.

A beam path is also possible in which the portion transmitted through the facet 28 in the first area 34 first runs through the face 29 and then strikes the next facet 28 in the first area 34 and is deflected by the latter, as represented schematically for the bundle of beams $24_2$. At the next facet 28 too, a portion can, once again, be transmitted, which then, after total reflection on the front and the rear side 8, 9 again, strikes a further facet 28 in the second area 35 and is deflected by this. In this manner, the coupling-out section 21 acts as a pupil expander.

The facets 28 are thus buried facets 28, in the same way as the facets 26 of the coupling-in section 20. The facets 26, 28 can extend to the front side 8 or can be spaced apart from the front side 8.

The facets 26 of the coupling-in section 20 and the facets 28 of the coupling-out section 21 can be formed such that, in addition to purely the beam deflection, an imaging effect is also realized. The shape and position of the facets can be determined e.g. by means of an optimization calculation. A curved reflective surface is used as a starting point, which provides the desired imaging effect and which is then approximated by the facets 26, 28. The individual facets 26, 28 can be flat or curved. Such a procedure is described for example in WO 2010/097442 A1 and in WO 2010/097439 A1, wherein the corresponding description, together with the figures, of these published documents are hereby incorporated in the present disclosure.

The reflectivity of the facets 26, 28 can be constant. However, it is also possible for the reflectivity to increase or decrease in the direction of the beam guiding.

In the embodiment described here of the described display device 1 the coupling of the virtual image into the user's field of view takes place via the left-hand spectacle lens 3. Naturally, a coupling-in via the right-hand spectacle lens 4 is also possible. In addition, the display device 1 can be formed such that images are reflected in via both spectacle lenses 3, 4. This can be carried out e.g. in such a way that a three-dimensional image impression forms.

The spectacle lenses 3, 4 can be produced e.g. from glass or from plastic.

While the invention has been described in connection with what is presently considered to be the most practical and preferred embodiments, it will be apparent to those of ordinary skill in the art that the invention is not to be limited to the disclosed embodiments. It will be readily apparent to those of ordinary skill in the art that many modifications and equivalent arrangements can be made thereof without departing from the spirit and scope of the present disclosure, such scope to be accorded the broadest interpretation of the appended claims so as to encompass all equivalent structures and products. Moreover, features or aspects of various example embodiments may be mixed and matched (even if such combination is not explicitly described herein) without departing from the scope of the invention.

The invention claimed is:

1. A spectacle lens for a display device that can be fitted on the head of a user and generate an image, the spectacle lens comprising:
    a spectacle lens body comprising a front side, a rear side, and as seen in top view onto the spectacle lens, a coupling-in section in an edge area of the spectacle lens and a coupling-out section in a central area of the spectacle lens, and two opposing reflecting surfaces in an area of the coupling-in section, and a plurality of facets embedded in the area of the coupling-in section in the spectacle lens body between the two opposing reflecting surfaces and arranged next to each other in a direction from the coupling-in to the coupling-out section in a first and an adjoining second area,
    wherein the facets in a first area are either partially reflective or reflective,
    wherein the facets in a second area are partially reflective,
    wherein the facets directly neighbouring one another in the second area are connected by a face which is partially transparent or transparent,
    wherein the spectacle lens is capable of guiding light bundles of pixels of the generated image that are coupled into the spectacle lens via the coupling-in section of the spectacle lens, in the spectacle lens by reflections to the coupling-out section and coupling them out of the spectacle lens via the coupling-out section,
    wherein the facets in the first area reflect the light bundles for the coupling-in at least partially to the second reflecting surface,
    wherein a reflection in the direction to the first reflecting surface takes place for the guiding of the light bundles, and
    wherein light bundles striking the faces in the second area thereby run through the faces to the first reflecting surface and are reflected on the first reflecting surface for the guiding of the light bundles, and after the reflection, are transmitted through the partially reflective facets in the second area.

2. The spectacle lens according to claim 1, wherein the first reflecting surface is formed by the front side.

3. The spectacle lens according to claim 1, wherein the second reflecting surface is formed by the rear side.

4. The spectacle lens according to claim 1, wherein at least one of the first and the second reflecting surfaces are formed between the front and the rear side.

5. The spectacle lens according to claim 1, wherein at least one of the first and the second reflecting surfaces are formed flat.

6. The spectacle lens according to claim 1, wherein the reflectivity of the first reflecting surface increases in the direction from the coupling-in to the coupling-out section.

7. The spectacle lens according to claim 1, wherein the reflectivity of the facets increases in the direction from the coupling-in to the coupling-out section.

8. The spectacle lens according to claim 1, wherein at least one of the coupling-in section and the coupling-out section have an imaging effect.

9. The spectacle lens according to claim 1, wherein the coupling-in section has a collimation effect.

10. A display device, comprising:
    a holder that can be fitted on the head of a user;
    an image-generating module secured to the holder, which generates an image; and an imaging optical system secured to the holder, which comprises a spectacle lens according to claim 1 and which, when the holder is fitted on the head, images the generated image such that the user can perceive it as a virtual image.

11. A spectacle lens for a display device that can be fitted on the head of a user and generate an image, the spectacle lens comprising:
- a spectacle lens body comprising a curved front side, a rear side, and as seen in top view onto the spectacle lens, a coupling-in section in an edge area of the spectacle lens and a coupling-out section in a central area of the spectacle lens;
- two opposing reflecting surfaces in the area of the coupling-out section; and
- a plurality of facets, which are embedded in the area of the coupling-out section in the spectacle lens body between the two reflecting surfaces and arranged next to each other in the direction from the coupling-in to the coupling-out section in a first and an adjoining second area;
- wherein the facets in the first area are partially reflective, the facets in the second area are completely reflective and the facets directly neighbouring one another in the first area are connected by a face which is partially transparent or transparent,
- wherein the spectacle lens is capable of guiding light bundles of pixels of the generated image, which are coupled into the spectacle lens via the coupling-in section of the spectacle lens, in the spectacle lens by reflection to the coupling-out section and coupling them out of the spectacle lens via the coupling-out section,
- wherein, for the coupling-out, the facets in the first area partially reflect the light bundles striking them for the coupling-out towards the second reflecting surface and partially transmit them to the first reflecting surface, where a reflection in the direction to the second reflecting surface takes place, and
- wherein light bundles striking the faces in the first area thereby run through the faces to the second reflecting surface and are reflected on the second reflecting surface to facets in the second area and reflected by these towards the second reflecting surface for the coupling-out.

* * * * *